(12) United States Patent
Dinh

(10) Patent No.: US 8,049,107 B2
(45) Date of Patent: Nov. 1, 2011

(54) WALL PLATE BRACKET

(75) Inventor: Cong Thanh Dinh, Collierville, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 459 days.

(21) Appl. No.: 12/199,926

(22) Filed: Aug. 28, 2008

(65) Prior Publication Data
US 2010/0051309 A1    Mar. 4, 2010

(51) Int. Cl.
*H02G 3/08* (2006.01)
*H01H 9/02* (2006.01)

(52) U.S. Cl. ............... 174/53; 174/50; 174/58; 220/3.2; 220/3.3; 248/906

(58) Field of Classification Search .................. 174/480, 174/481, 50, 53, 57, 58; 220/3.2–3.9, 4.02; 248/906; D13/152, 177; 439/535, 536
See application file for complete search history.

(56) References Cited

U.S. PATENT DOCUMENTS

| | | | |
|---|---|---|---|
| 691,874 A | 1/1902 | Robinson | |
| 1,694,054 A | 12/1928 | Both | |
| 2,828,394 A | 3/1958 | Mayzik | |
| D214,449 S | 6/1969 | Greene | |
| 3,530,230 A | 9/1970 | Cormier et al. | |
| 3,864,511 A | 2/1975 | Morby et al. | |
| 3,966,152 A | 6/1976 | Bromberg | |
| 4,048,491 A | 9/1977 | Wessman | |
| 4,059,327 A | 11/1977 | Vann | |
| 4,451,108 A | 5/1984 | Skidmore | |
| 4,559,410 A | 12/1985 | Hostetter | |
| 4,603,229 A | 7/1986 | Menchetti | |
| 4,613,728 A | 9/1986 | Lathrop | |
| 4,642,418 A | 2/1987 | Menchetti | |
| 4,721,476 A | 1/1988 | Zeliff et al. | |
| 4,758,687 A | 7/1988 | Lathrop | |
| 4,778,399 A | 10/1988 | Schenk | |
| D308,464 S | 6/1990 | Freeman et al. | |
| 4,972,045 A | 11/1990 | Primeau | |
| 4,988,832 A | 1/1991 | Shotey | |
| 5,114,365 A | 5/1992 | Thompson et al. | |
| 5,117,122 A | 5/1992 | Hogarth et al. | |
| 5,221,814 A | 6/1993 | Colbaugh et al. | |

(Continued)

OTHER PUBLICATIONS

Information Disclosure Statement dated Mar. 1, 2007 and Form PTO-1449 for U.S. Appl. No. 11/679,197, filed Feb. 27, 2007 (2 pages).

(Continued)

*Primary Examiner* — Angel R Estrada
(74) *Attorney, Agent, or Firm* — Hoffmann & Baron, LLP

(57) ABSTRACT

The wall plate bracket is for a high voltage outlet, and includes a wall plate having front and rear surfaces. The wall plate has an interior opening. A support housing has an inner surface and an interior region bounded by the inner surface. The support housing is connected to the rear surface such that the interior opening provides access to the interior region. The support housing is configured for support of the high voltage outlet within the interior region. A clamp is connected to the wall plate for securing the wall plate to a wall structure. The rear surface of the wall plate may have a rib to limit the clearance between the support housing and rear surface. Alternatively, the clearance may be limited by a recess in the rear surface in which a mounting tab of the support housing is located.

14 Claims, 8 Drawing Sheets

U.S. PATENT DOCUMENTS

| | | | |
|---|---|---|---|
| 5,243,134 | A | 9/1993 | Nattel |
| 5,257,946 | A | 11/1993 | MacMillan et al. |
| D343,825 | S | 2/1994 | Enderby |
| D348,870 | S | 7/1994 | Warrington |
| 5,419,716 | A | 5/1995 | Sciammarella et al. |
| 5,486,650 | A | 1/1996 | Yetter |
| 5,574,256 | A | 11/1996 | Cottone |
| 5,598,998 | A | 2/1997 | Lynn |
| 5,651,696 | A | 7/1997 | Jennison |
| D401,566 | S | 11/1998 | Gesmondi et al. |
| 5,931,432 | A | 8/1999 | Herold et al. |
| 5,934,917 | A | 8/1999 | Haut |
| 6,026,605 | A | 2/2000 | Tippett |
| 6,093,890 | A | 7/2000 | Gretz |
| 6,102,360 | A | 8/2000 | Clegg et al. |
| 6,127,630 | A | 10/2000 | McKenzie et al. |
| 6,147,304 | A | 11/2000 | Doherty |
| 6,194,657 | B1 | 2/2001 | Gretz |
| 6,200,159 | B1 | 3/2001 | Chou |
| 6,207,895 | B1 | 3/2001 | Engel |
| 6,222,124 | B1 | 4/2001 | Pritchard et al. |
| 6,323,424 | B1 | 11/2001 | He |
| 6,346,674 | B1 | 2/2002 | Gretz |
| 6,414,906 | B1 | 7/2002 | Gaspari |
| D462,939 | S | 9/2002 | Dinh |
| D463,376 | S | 9/2002 | Roesch et al. |
| 6,444,906 | B1 | 9/2002 | Lewis |
| D463,969 | S | 10/2002 | Luu |
| D467,229 | S | 12/2002 | Heggem |
| 6,545,218 | B1 | 4/2003 | Blaess |
| 6,566,602 | B1 | 5/2003 | Miller et al. |
| 6,573,446 | B1 | 6/2003 | Umstead et al. |
| D478,553 | S | 8/2003 | Heggem |
| 6,637,166 | B2 | 10/2003 | Kinsey |
| 6,753,471 | B2 | 6/2004 | Johnson et al. |
| D495,301 | S | 8/2004 | Newell |
| 6,872,887 | B2 | 3/2005 | Shotey et al. |
| 6,956,171 | B1 | 10/2005 | Gretz |
| 7,044,318 | B2 | 5/2006 | Gates, II |
| 7,078,618 | B2 | 7/2006 | Dinh |
| D527,984 | S | 9/2006 | Dinh |
| 7,214,878 | B2 | 5/2007 | Dinh |
| D544,783 | S | 6/2007 | Dinh |
| D545,276 | S | 6/2007 | Dinh |
| 7,300,025 | B2 | 11/2007 | Korcz |
| 7,595,446 | B2 * | 9/2009 | Turcovsky et al. ............. 174/50 |
| 2003/0024927 | A1 | 2/2003 | MacDonald |
| 2003/0178421 | A1 | 9/2003 | Almond |
| 2004/0123996 | A1 | 7/2004 | Lalancette et al. |
| 2004/0238197 | A1 | 12/2004 | Gates, II |
| 2005/0072778 | A1 | 4/2005 | Hull et al. |
| 2005/0183873 | A1 | 8/2005 | Gottardo et al. |
| 2008/0202787 | A1 | 8/2008 | Turcovsky et al. |

OTHER PUBLICATIONS

"Photo Sheet No. 1: Three views of prior art box" attached to Information Disclosure Statement dated Mar. 1, 2007 for U.S. Appl. No. 11/679,197, filed Feb. 27, 2007 (1 page).

"Photo Sheet No. 2: (a) One view of box with frame. (b) Two views of box alone." attached to Information Disclosure Statement dated Mar. 1, 2007 for U.S. Appl. No. 11/679,197, filed Feb. 27, 2007 (1 page).

"Photo Sheet No. 3: (a) Two views of box alone. (b) One view of frame." attached to Information Disclosure Statement dated Mar. 1, 2007 for U.S. Appl. No. 11/679,197, filed Feb. 27, 2007 (1 page).

"Carlon® Recessed Dual Voltage 3-Gang Old Work Plate" (3 pages).

* cited by examiner

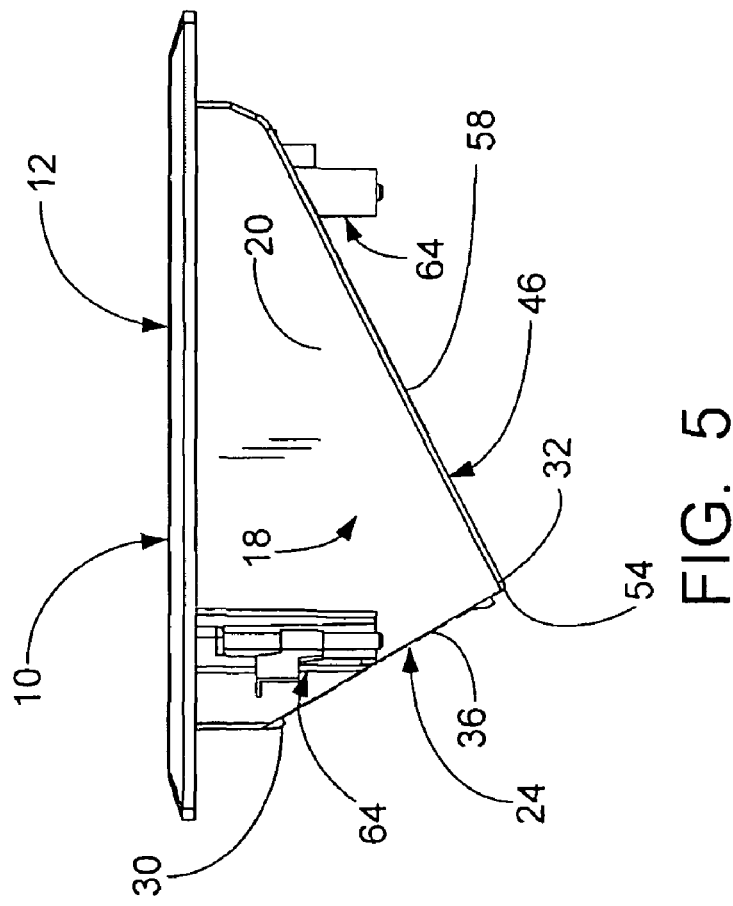
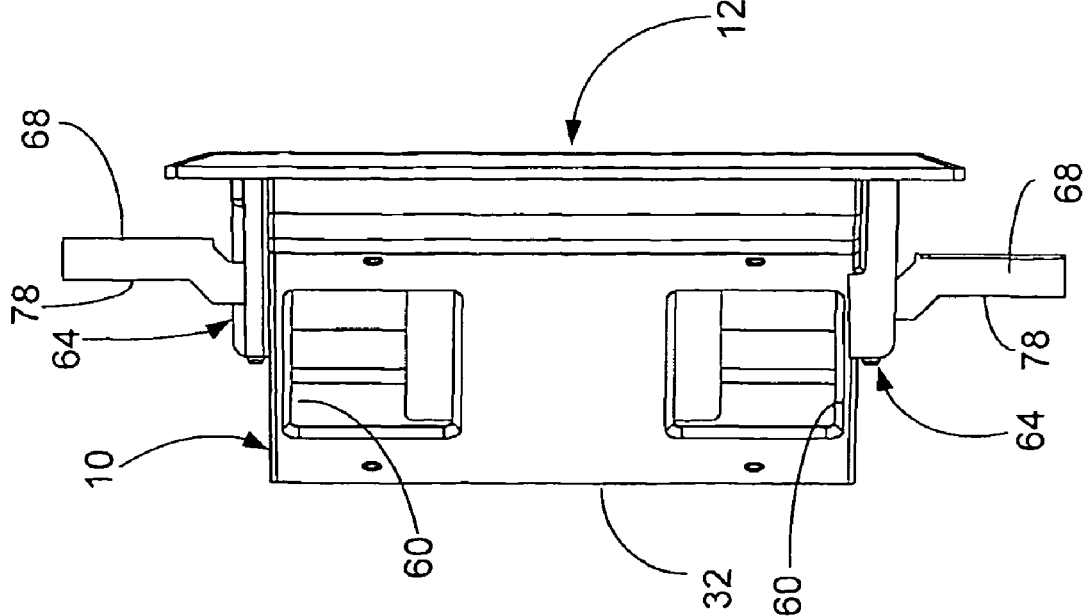

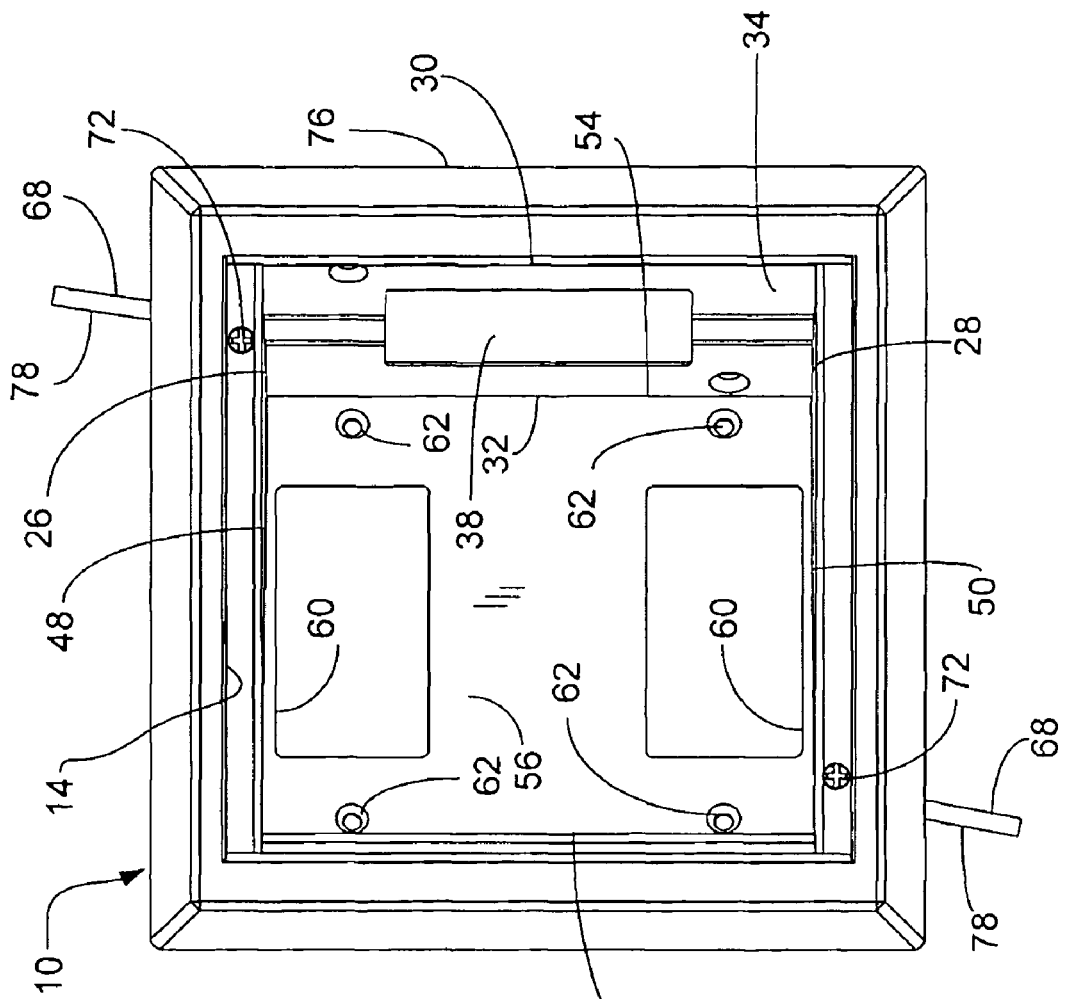
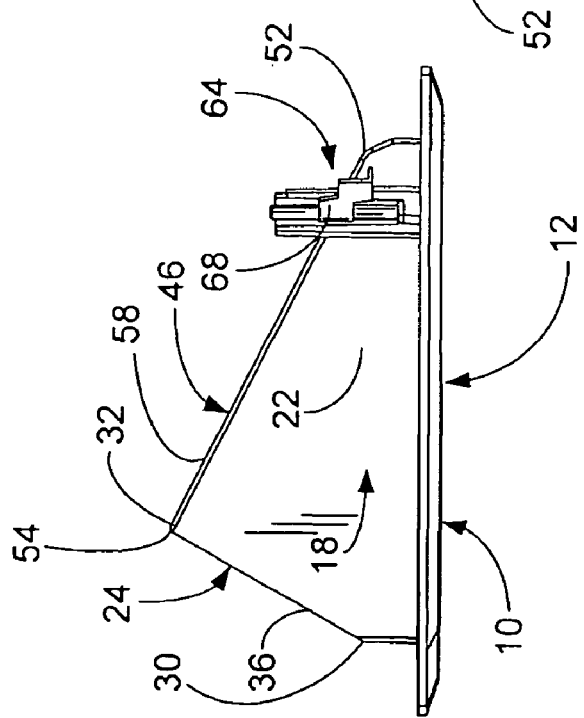
FIG. 7
FIG. 6

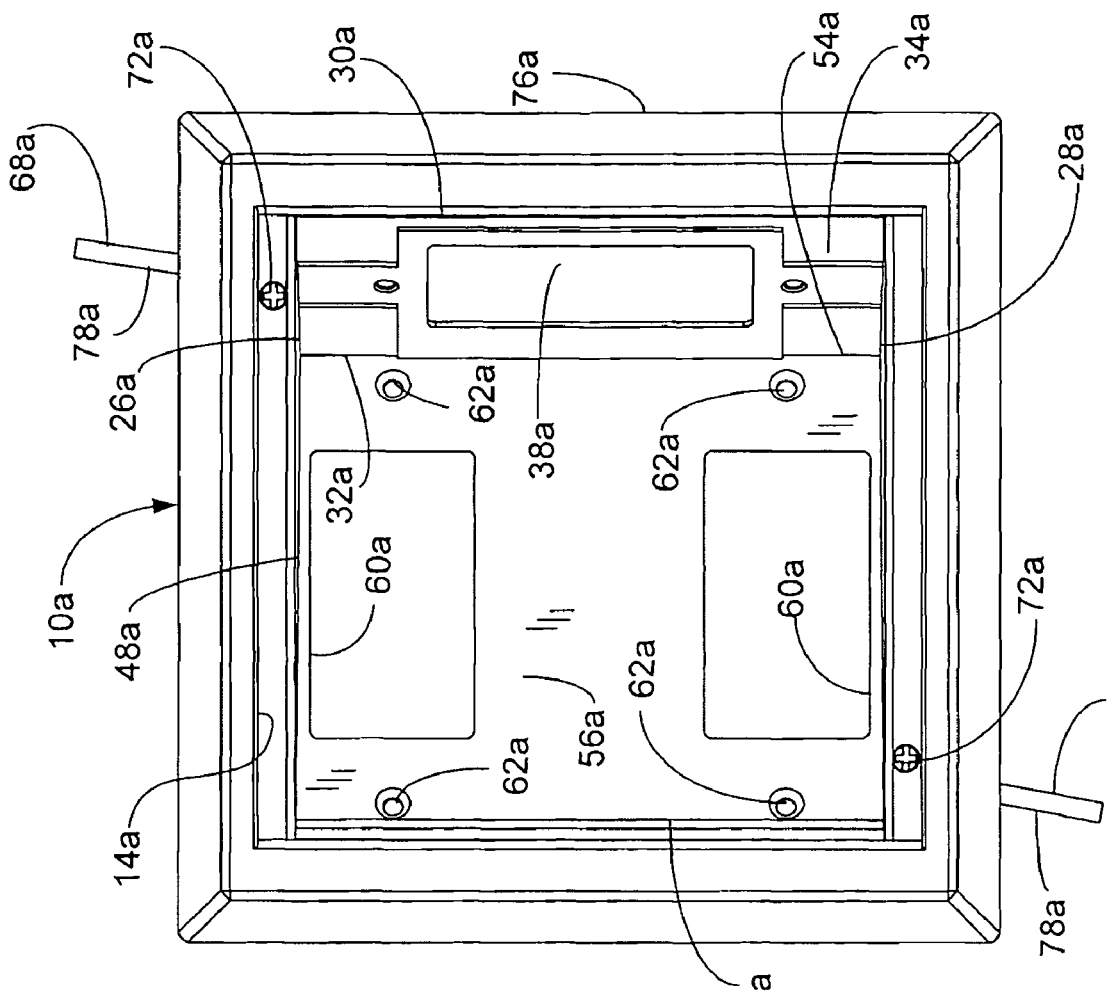
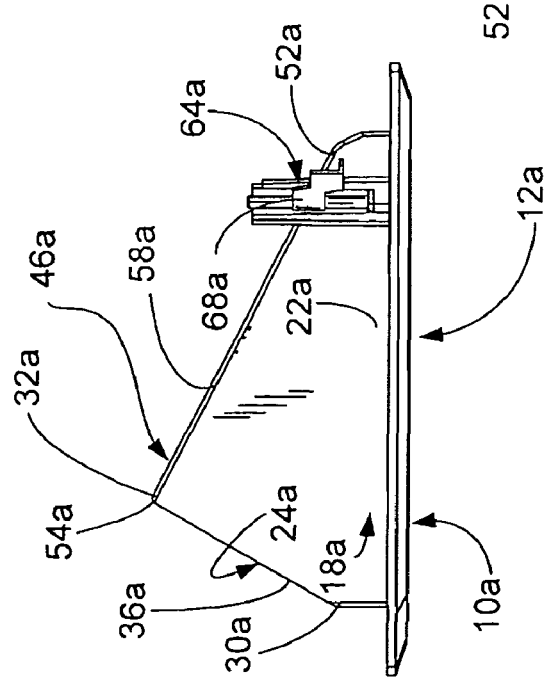
FIG. 14
FIG. 13

WALL PLATE BRACKET

BACKGROUND OF THE INVENTION

The present invention relates generally to a wall plate bracket for mounting one or more high voltage outlets and low voltage connectors on wall structures, and more particularly, to such a bracket in which outlets and connectors are recessed from the wall structure.

The high voltage outlets have receptacles into which are inserted the prongs of an electrical plug for supplying electrical power to a conductor which is connected to the plug. High voltage outlets are also known as electrical power outlets. The high voltage outlet includes a support housing, which may be a box, within which the receptacles for the prongs of the electrical plug are supported. The support housing is secured to a stud in the wall structure such that the receptacles of the high voltage outlet are accessible through an opening in the wall structure from the front thereof. A wall plate is secured to the front of the support housing such that the wall surface of the wall structure is located between the wall plate and the rear of the support housing. The wall plate has an opening such that the receptacles of the high voltage outlet are accessible through the opening in the wall plate from the region in front of the wall structure. The clearance or gap between the support housing and wall plate is typically covered by a cover plate which is secured to the front surface of the wall plate. The cover plate has an opening such that the receptacles of the high voltage outlet are accessible through the opening in the cover plate from the region in front of the wall structure.

Wall plates may also provide support to low voltage connectors which provide junctions for the conductors of low voltage devices, such as telephones, televisions, data cables, and other communication equipment. Such other communication equipment may be used for connecting a computer to the internet or a local area network (LAN). Such wall plates may locate the low voltage connectors in the same plane as the front surface of the wall structure thereby exposing the connectors and the plugs inserted therein to contact from persons, furniture or other objects which may move in close proximity to the connectors. Such contact may be undesirable by urging the plugs to become dislodged from the low voltage connectors or by exceeding the structural strength of the plugs or connectors. The clearance or gap between each low voltage connector and wall plate is typically covered by a cover plate which is secured to the front surface of the wall plate. The cover plate has an opening such that the corresponding low voltage connector is accessible through the opening in the cover plate from the region in front thereof.

Wall plates may provide support for high voltage outlets without providing support for low voltage connectors. Also, wall plates may provide support for low voltage connectors without providing support for high voltage outlets. Both of such wall plates may be required to provide the connections needed by devices which require electrical power and low voltage connections. Such devices may include a combined telephone and answering machine, television, or a personal computer. Such separate wall plates typically require redundant structures and often require separate openings in the wall structure in which the wall plates are supported. Also, such separate wall plates may be located apart from one another by a significant distance. This distance may cause inconvenience for a device which requires connection to a high voltage outlet and a low voltage connector since locating such a device in close proximity to both of such separate wall plates may be difficult.

The gap or clearance between the box of the high voltage outlet and wall plate is typically limited by building and electrical codes. Also, the high voltage outlets and low voltage connectors may be recessed from the wall structure to which the wall plates are secured.

SUMMARY OF THE INVENTION

The wall plate bracket of the present invention is for a high voltage outlet. The bracket includes a wall plate having front and rear surfaces. The wall plate has an interior opening. A support housing has an inner surface and an interior region bounded by the inner surface. The support housing is connected to the rear surface such that the interior opening provides access to the interior region. The support housing is configured for support of the high voltage outlet within the interior region. A clamp is connected to the wall plate for securing the wall plate to a wall structure. Consequently, mounting of the support housing to a support member within the wall structure, such as a stud, is not necessary.

The wall plate may have a rib which is connected to the rear surface of the wall plate. The rib is located relative to the interior opening such that the rib is located between the support housing and rear surface. The rib which is connected to the rear surface covers a portion of the clearance or gap between the support housing and rear surface which reduces the clearance. Limiting the clearance between the support housing and rear surface obstructs access to the interior of the support housing where the high voltage outlet is located. Consequently, reducing the clearance facilitates compliance with the building and electrical codes which limit the size of the clearance.

The support housing may alternatively be positioned relative to the wall plate by a recess in the rear surface therein. The recess is located relative to the interior opening such that a mounting tab on the support housing extends into the recess. This limits the clearance between the support housing and rear surface.

The wall plate bracket of the present invention also provides for the connection of the support housing to a planar high voltage plate, and the support of a low voltage connector on a planar low voltage plate. The high and low voltage plates are connected to a faceplate such that the high and low voltage plates extend rearwardly relative to the faceplate. Access to the high and low voltage plates is provided through an interior opening of the faceplate. The low voltage plate intersects the high voltage plate which simplifies and makes more compact the configuration of the high and low voltage plates.

These and other features of the invention will be more fully understood from the following description of specific embodiments of the invention taken together with the accompanying drawings.

BRIEF DESCRIPTION OF THE DRAWINGS

In the drawings:

FIG. 4 is a left side elevation view of the wall plate bracket of FIG. 1, the support housing, low voltage connectors, and fasteners being removed;

FIG. 5 is a top plan view of the wall plate bracket of FIG. 1, the support housing, low voltage connectors, and fasteners being removed;

FIG. 6 is a bottom plan view of the wall plate bracket of FIG. 1, the support housing, low voltage connectors, and fasteners being removed;

FIG. 7 is a front elevation view of the wall plate bracket of FIG. 1, the support housing, low voltage connectors, and fasteners being removed;

FIG. 13 is a bottom plan view of the wall plate bracket of FIG. 8, the support housing, low voltage connectors, and fasteners being removed; and FIG. 14 is a front elevation view of the wall plate bracket of FIG. 8, the support housing, low voltage connectors, and fasteners being removed.

Corresponding reference characters indicate corresponding parts throughout the several views of the drawings.

DETAILED DESCRIPTION OF THE INVENTION

Figure 1:
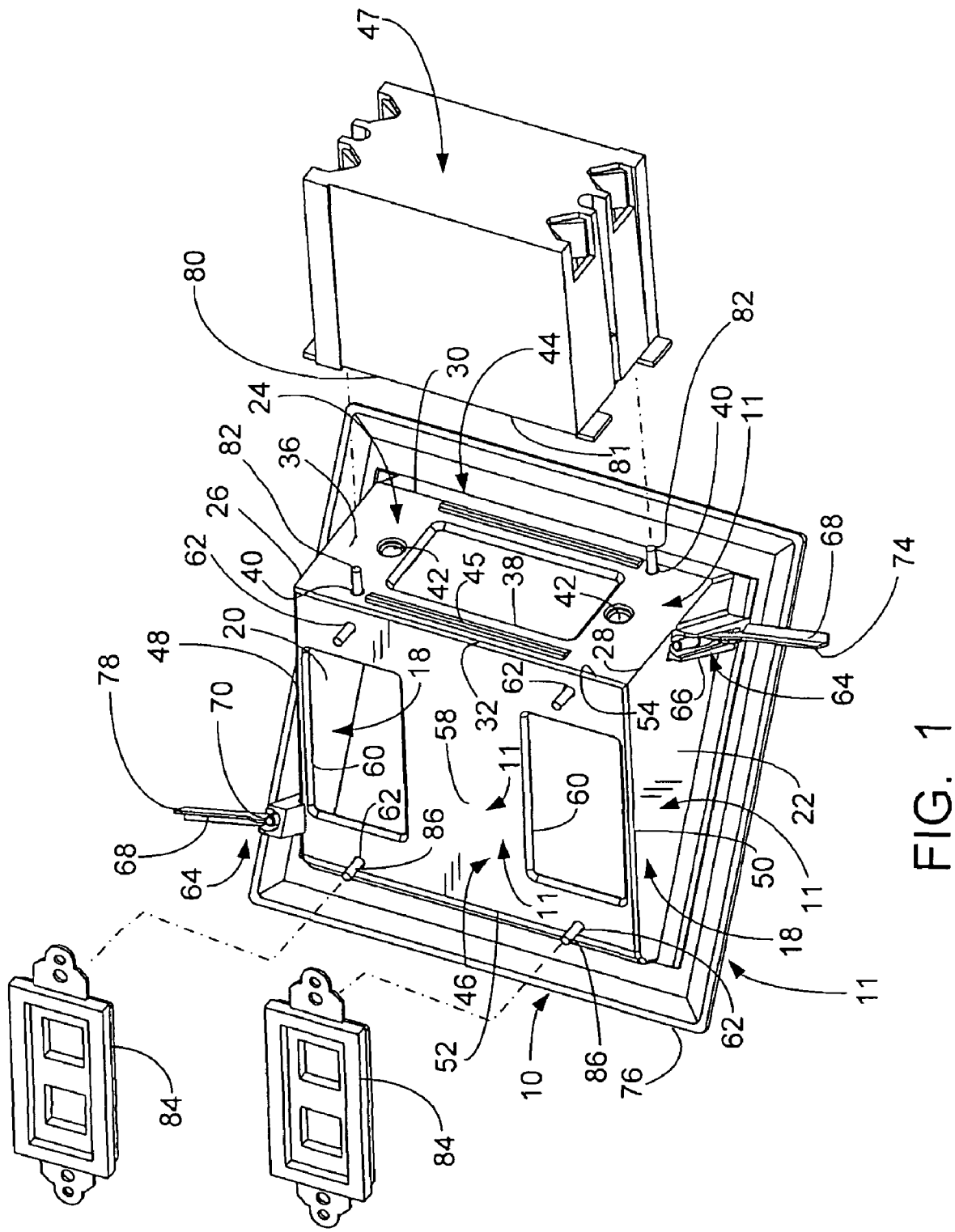
FIG. 1 is a rear perspective view of the wall plate bracket of the present invention showing the ribs on the rear surface of the high voltage plate, the support housing and low voltage connectors being shown before assembly to the bracket.
Figure 3:
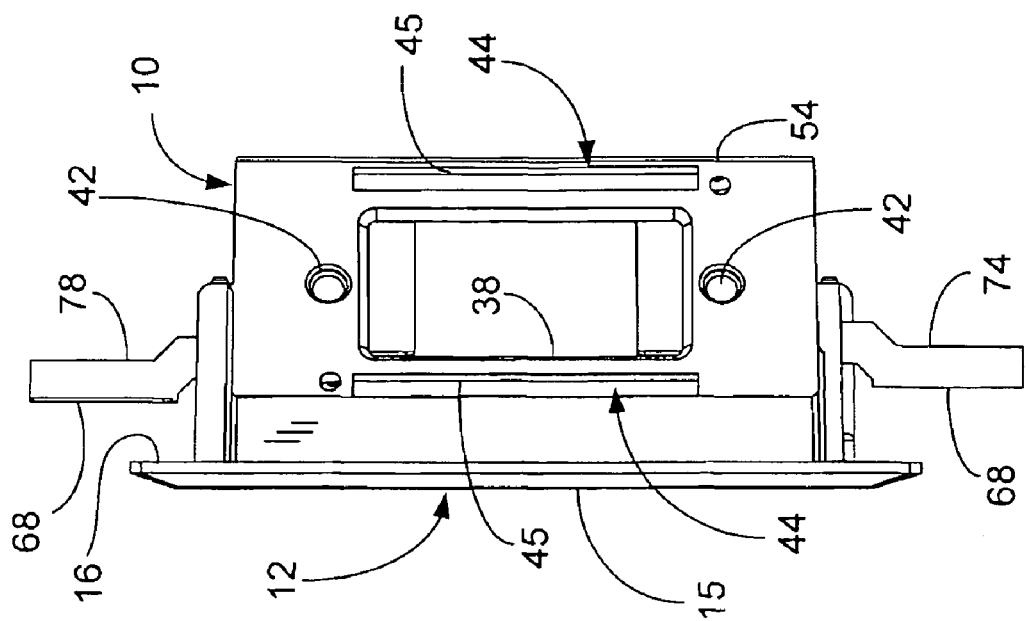
FIG. 3 is a right side elevation view of the wall plate bracket of FIG. 1, the support housing, low voltage connectors, and fasteners being removed.
Figure 2:
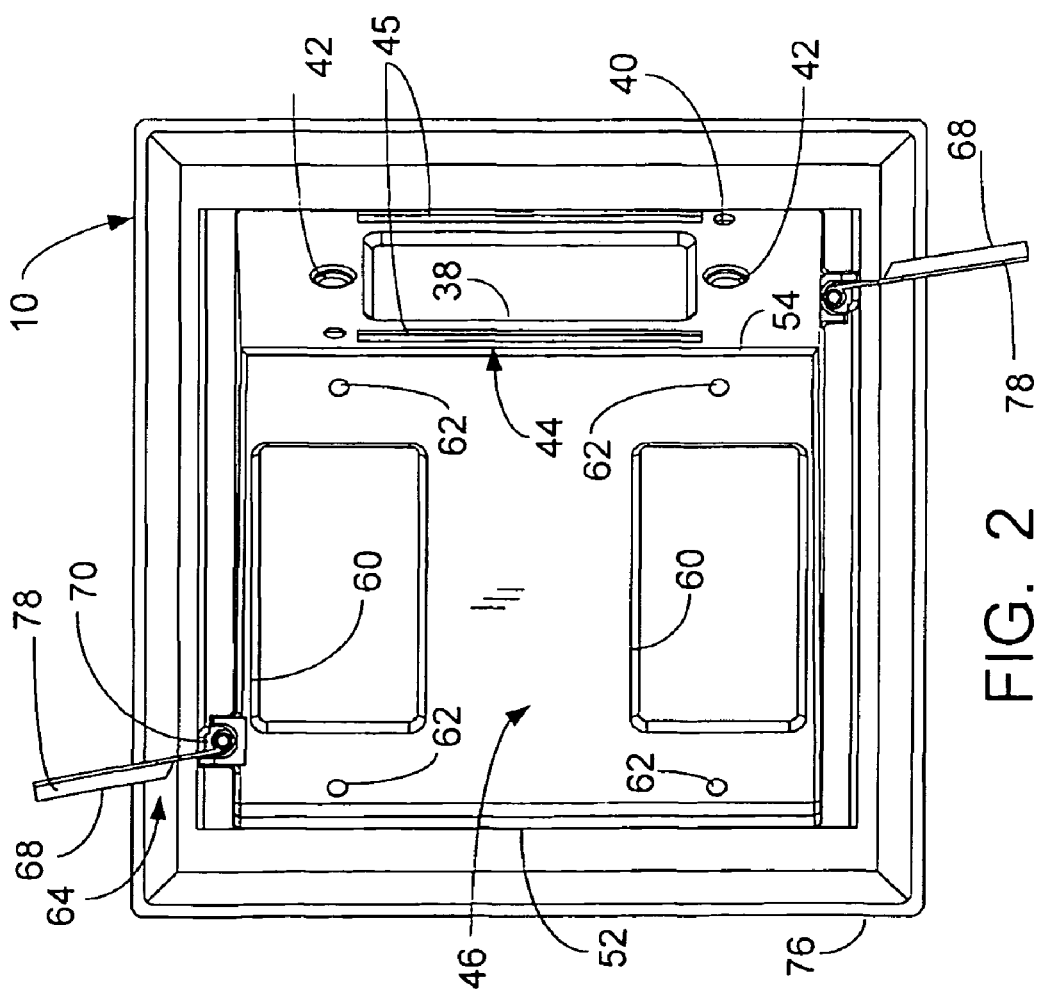
FIG. 2 is a rear elevation view of the wall plate bracket of FIG. 1, the support housing, low voltage connectors, and fasteners being removed.

Referring to the drawings and more particularly to FIGS. 1 to 7, a wall plate bracket 10 is shown for mounting to a wall structure, such as the vertical wall board of an interior wall of a building structure.

The wall plate bracket 10 includes a wall plate 11. The wall plate 11 includes a faceplate 12 which has an opening 14. The faceplate 12 has front and rear surfaces 15, 16.

The wall plate 11 includes a flange structure 18 which is secured to the rear surface 16. The flange structure 18 includes opposing flanges 20, 22 which have a perpendicular orientation relative to the faceplate 12. The flanges 20, 22 are located relative to the faceplate 12 such that the opening 14 is between the flanges.

The wall plate 11 includes a planar high voltage plate 24 which has end edges 26, 28 and side edges 30, 32. The high voltage plate 24 is connected to the faceplate 12 by the side edge 30 being fixed thereto. The faceplate 12 is connected to the flange 20 by the end edge 28 being fixed thereto. The faceplate 12 is connected to the flange 22 by the end edge 26 being fixed thereto.

The high voltage plate 24 has front and rear surfaces 34, 36. The high voltage plate 24 includes a rectangular interior opening 38 which is oriented relative to the high voltage plate 24 such that the side edges of the opening are parallel to the side edges 30, 32. The high voltage plate 24 has a pair of holes 40 located near diametrically opposed corners thereof. The high voltage plate 24 includes a pair of circular recesses surrounding openings 42 located on the rear surface 36 adjacent to the end edges of the opening 14.

The high voltage plate 24 has a pair of elongate ribs 44 located adjacent to opposing side edges of the interior opening 38. The ribs 44 are parallel to the side edges of the interior opening 38 and are located such that the interior opening is between the ribs. In this embodiment, the ribs 44 have corresponding upper ends which are located slightly above the upper edge of the interior opening 38. Likewise, the ribs 44 have corresponding lower ends which are located slightly below the lower edge of the interior opening 38. The ribs 44 each have a corresponding rear edge 45.

The wall plate bracket 10 includes a support housing or box 47 having an inner surface and an interior region which is bounded by the inner surface. The support housing 47 has a front surface 81. The support housing 47 is configured for support of a high voltage outlet 80 which is located within the interior region. The front surface of the high voltage outlet 80 contains receptacles for the prongs of the plugs.

The support housing 47 is assembled to the high voltage plate 24 by initially placing the front surface 81 against the corresponding rear edges 45 at the ribs 44 such that the receptacles of the high voltage outlet 80 are accessible through the interior opening 38. The support housing 47 has a pair of screws which are located adjacent to the ends of the front surface 81. The screws have heads which extend forwardly beyond the front surface 81. The forwardly extending heads of the screws extend into the corresponding recesses 42 when the front surface 81 of the support housing 47 is located against the corresponding rear edges 45 of the ribs 44.

The support housing 47 is located relative to the interior opening 38 such that the holes 40 are aligned with corresponding holes in the support housing. This provides for the insertion of respective elongate fasteners 82 through the holes 40 and corresponding holes in the support housing 47. The fasteners 82 may be screws or bolts. The fasteners 82 may have a threaded engagement with the corresponding holes in the support housing 47 or, alternatively, a threaded engagement with corresponding nuts such that tightening the fasteners draws the support housing into engagement with the rear edges 45 of the ribs 44 to secure the support housing thereto. It should be noted that in accordance with this invention, the support housing or box 47 is secured to and supported from the bracket 10 and is not directly secured or mounted to a stud or other wall support as is usually the case.

The securing of the support housing 47 to the high voltage plate 24 locates the receptacles of the high voltage outlet 80 within the interior opening 38. The interior opening 38 is preferably sized to accept a Decora-type high voltage outlet 80 and, hence, a separate cover plate is not needed. A Decora-type high voltage outlet 80 has a periphery which corresponds to the periphery of the interior opening 38 such that the high voltage outlet is accommodated within the interior opening 38.

The wall plate 11 includes a planar low voltage plate 46 which has end edges 48, 50 and side edges 52, 54. The low voltage plate 46 is connected to the faceplate 12 by the side edge 52 being fixed thereto. The low voltage plate 46 is connected to the upper flange 20 by the end edge 50 being fixed thereto. The low voltage plate 46 is connected to the lower flange 22 by the end edge 48 being fixed thereto. The low voltage plate 46 intersects the high voltage plate 24 by the side edge 54 being fixed to the side edge 32 in contiguous relation thereto.

The low voltage plate 46 has front and rear surfaces 56, 58, and a pair of rectangular interior openings 60. The interior openings 60 are oriented relative to the low voltage plate 46 such that the side edges thereof are parallel to the end edges 48, 50. The low voltage plate 46 has a circular hole 62 located next to each of the end edges of the interior openings 60 such that each of the interior openings is located between a pair of the holes 62.

The low voltage connectors 84 are assembled to the wall plate bracket 10 by placing the front surfaces of the low voltage connectors against the rear surface 58 of the low voltage plate 46 such that the sections of the low voltage connectors to which the low voltage plugs attach are accessible through the corresponding interior opening 60. The low voltage connectors 84 are secured to the low voltage plate 46 by elongate fasteners 86. The fasteners 86 may be screws or bolts. The fasteners 86 extend through the corresponding hole 62 and into corresponding holes in the low voltage connectors 84. The fasteners 86 may have a threaded engagement with the corresponding holes in the low voltage connectors 84 or, alternatively, a threaded engagement with corresponding nuts such that tightening the fasteners 86 draws the low voltage connectors into engagement with the rear surface 58 of the low voltage plate 46 to secure the low voltage connectors thereto.

The interior openings 60 are preferably sized to accept corresponding Decora-type low voltage connectors 84 and, hence, respective separate cover plates are not needed. A Decora-type low voltage connector 84 has a periphery which corresponds to the periphery of the corresponding interior opening 60 such that the low voltage connector is accommodated within the interior opening 60.

The wall plate bracket 10 includes a pair of clamps 64 which are secured to the faceplate 12 and flange structure 18 near diagonally opposing corners of the faceplate. Each of the clamps 64 has an elongate flange 66 and an arm 68 pivotally connected to the corresponding flange in perpendicular relation thereto. Each of the flanges 66 is connected to the rear surface 16 of the faceplate 12 and to the corresponding adjacent flange 20, 22. The arms 68 are each coupled to an elongate member, such as a pin 70, which extends through the corresponding flange 66. The forward ends of the pins 70 each have a head 72 to which may be coupled a tool for rotating the pin. Such coupling may be provided, for example, by forming in the front surface of each of the head 72 a recess which may be engaged by a screw driver. Rotation of each of the pins 70, such as by a screw driver, causes pivoting of each of the arms 68 about the corresponding flange 66. The arms 68 may each thereby be swung from a retracted position in which the corresponding arm is within the outer periphery 76 of the faceplate 12 to a secured position 78 in which the corresponding arm extends beyond the outer periphery.

The wall plate bracket 10 is mounted to the wall structure initially by orienting the bracket such that the rear surface 16 of the faceplate 12 faces the opening in the wall structure. The outer periphery 76 of the faceplate 12 extends beyond the periphery of the opening in the wall structure. The support housing 47 and low voltage connector 84 are within the periphery of the opening in the wall structure which allows the insertion of the low voltage connectors and support housing through the opening in the wall structure. Before such insertion, the arms 68 are swung to the corresponding retracted positions by rotating the corresponding pins 70, such as by engaging the corresponding heads 72 with a screw driver. When the arms 68 are in the corresponding retracted positions, the arms do not obstruct insertion of the support housing 47 and low voltage connectors 84 through the opening in the wall structure. Accordingly, with the arms 68 in the corresponding retracted positions, the support housing 47 and low voltage connectors 84 are inserted through the opening in the wall structure.

The relative sizes of the support housing 47 and low voltage connectors 84, and opening in the wall structure result in the rear surface 16 of the faceplate 12 squarely contacting the outer surface of the wall structure adjacent to the opening therein. The longitudinal positions of the arms 68 on the corresponding flanges 66 result in the arms being to the rear of and adjacent to the wall structure when the rear surface 16 of the faceplate 12 squarely contacts the outer surface of the wall structure. This relative positioning of the arms 68 and the wall structure. allows the arms to be swung to the corresponding secured positions 78 when the faceplate 12 squarely contacts the outer surface of the wall structure.

Following insertion of the support housing 47 and low voltage connectors 84 into the opening in the wall structure such that the rear surface 16 of the faceplate 12 squarely contacts the outer surface of the wall structure, the arms 68 are swung to the corresponding secured positions 78 by rotating the corresponding pins 70, such as by engaging the corresponding heads 72 with a screw driver. Moving the arms 68 to the corresponding secured positions 78 results in the wall structure being secured between the arms and faceplate 12. This securing obstructs forward retraction of the support housing 47 and low voltage connectors 84 through the opening in the wall structure.

The wall plate bracket may be released and retracted from the opening in the wall structure by swinging the arms 68 to the corresponding retracted positions by rotating the corresponding pins 70, such as by engaging the corresponding heads 72 with a screw driver. The arms 68, when in the corresponding retracted positions, do not obstruct forward retraction of the support housing 47 and low voltage connectors 84 through the opening in the wall structure.

An alternative embodiment of the wall plate bracket 10a is shown in FIGS. 8 to 14. Parts illustrated in FIGS. 8 to 14 which correspond to parts illustrated in FIGS. 1 to 7 have the same reference numeral as in FIGS. 1 to 7 with the addition of the suffix "a" in FIGS. 8 to 14. The rear surface 36a of the high voltage plate 24a has a recess 88 which includes a pair of shoulder sections 90. The shoulder sections 90 are located adjacent to the end edges of the interior opening 38a. The holes 40a are located within the shoulder sections 90a.

The support housing 47a has a pair of mounting tabs 92 each of which has a corresponding hole 94. The outer peripheries of the front surface 81a and the outer edges of the mounting tabs 92 correspond to and are slightly smaller than the outer periphery of the recess 88. The shoulder sections 90 each have a depth which corresponds to the thickness of the respective mounting tab 92 located therein.

Figure 8:
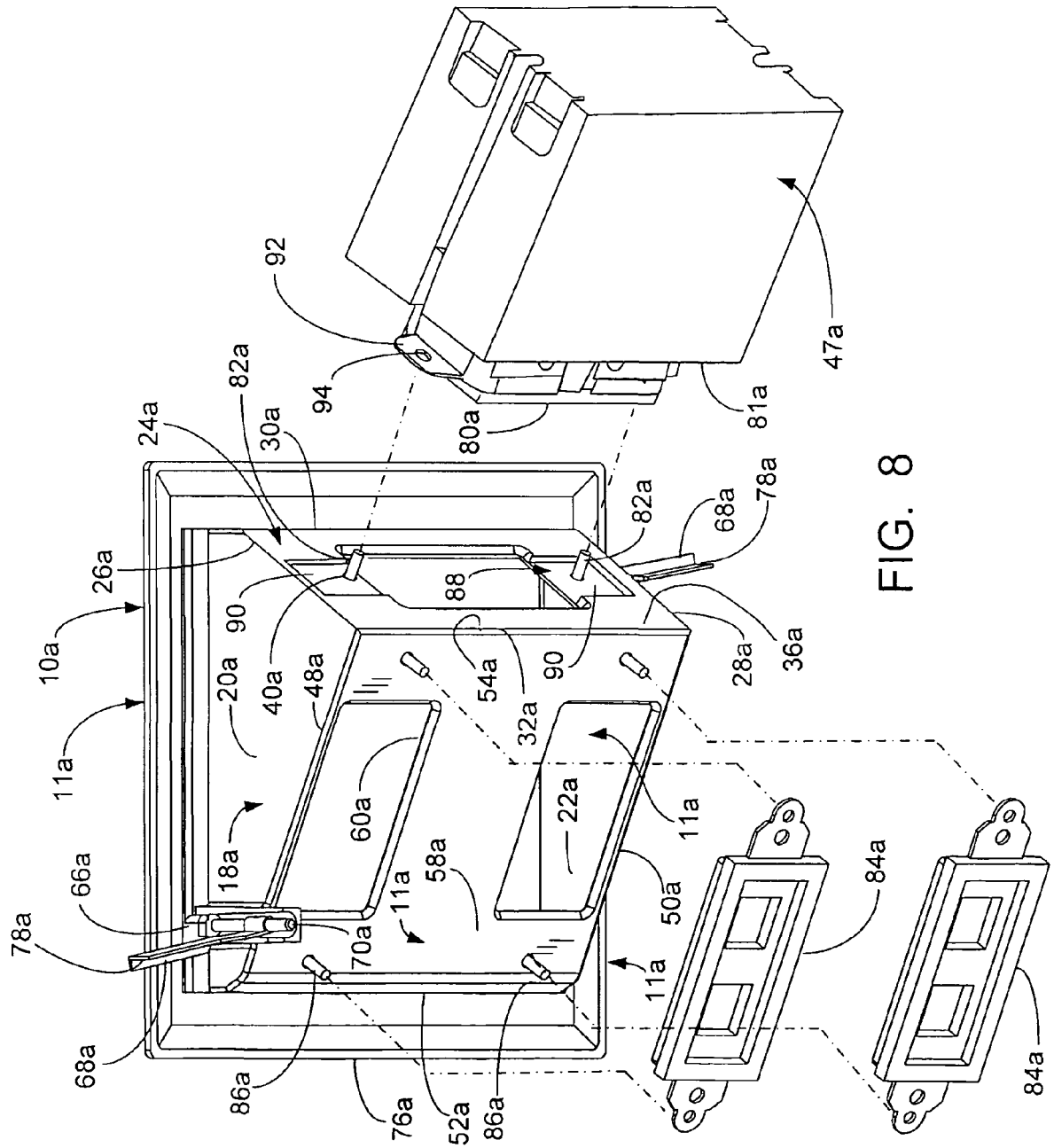
FIG. 8 is a front perspective view of an alternative second embodiment of the wall plate bracket of FIG. 1, the recess being shown on the rear surface of the high voltage plate, the support housing and low voltage connectors being shown before assembly to the bracket.
Figure 10:
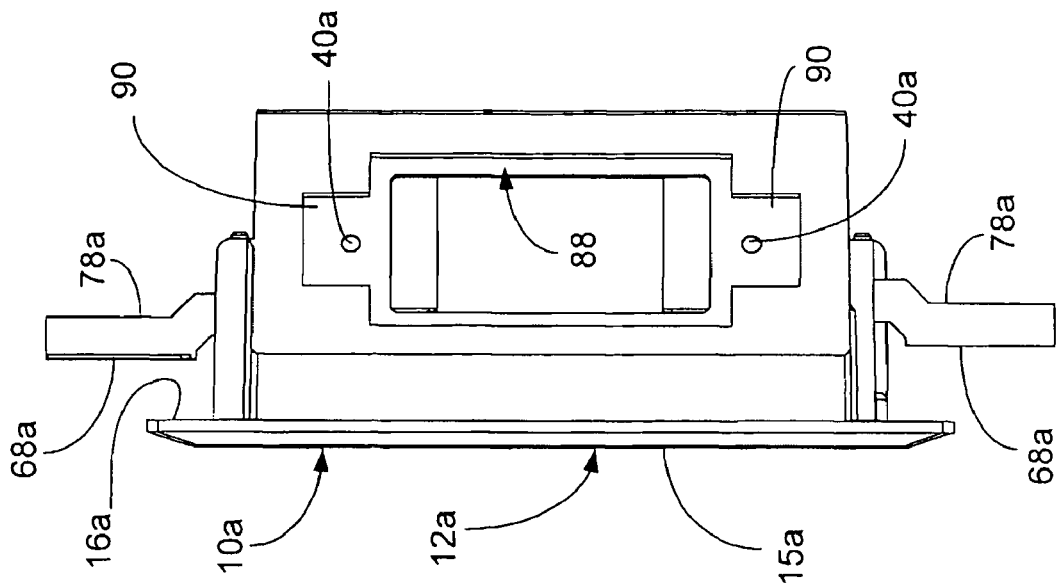
FIG. 10 is a right side elevation view of the wall plate bracket of FIG. 8, the support housing, low voltage connectors, and fasteners being removed.
Figure 9:
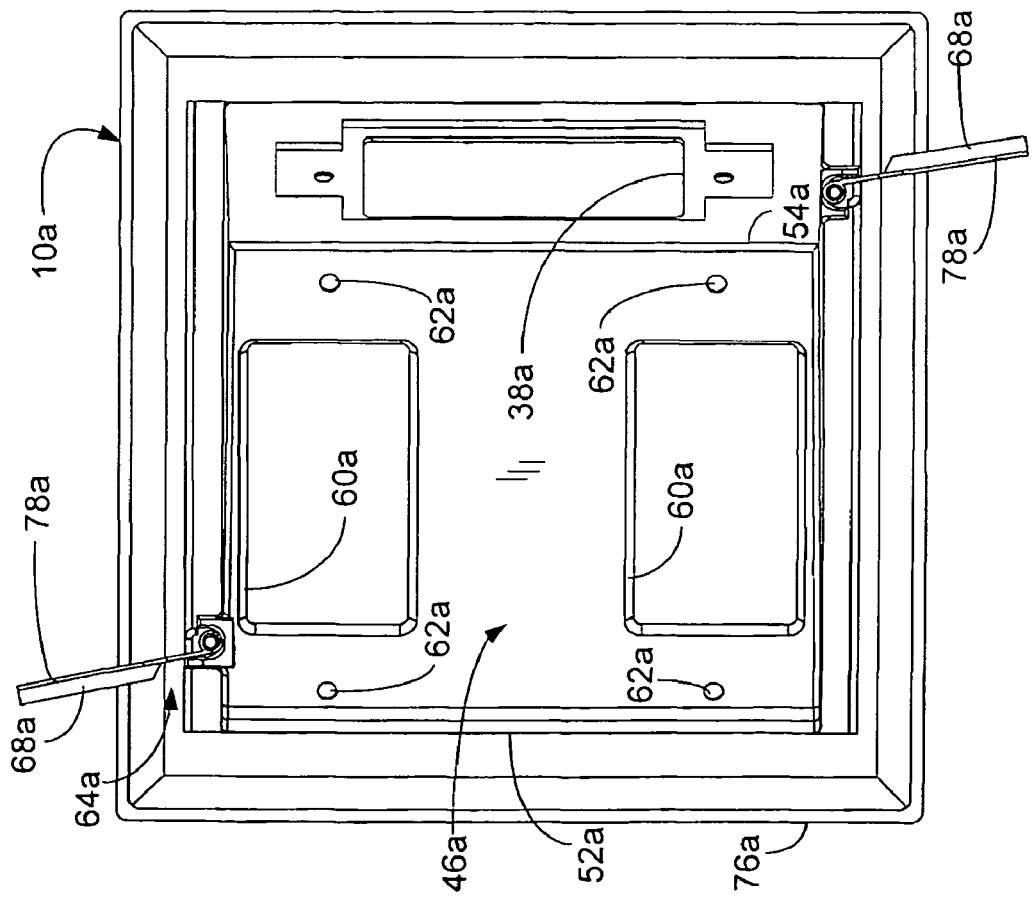
FIG. 9 is a rear elevation view of the wall plate bracket of FIG. 8, the support housing, low voltage connectors, and fasteners being removed.
Figure 12:
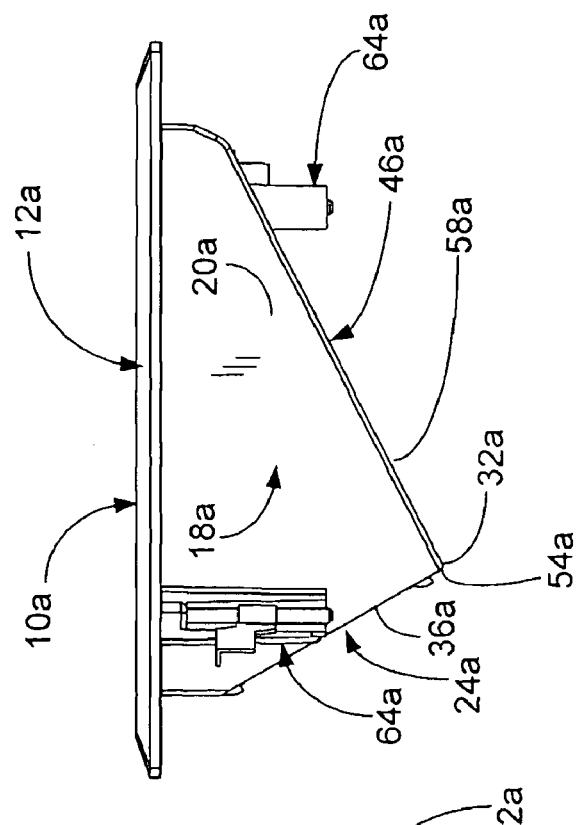
FIG. 12 is a top plan view of the wall plate bracket of FIG. 8, the support housing, low voltage connectors, and fasteners being removed.
Figure 11:
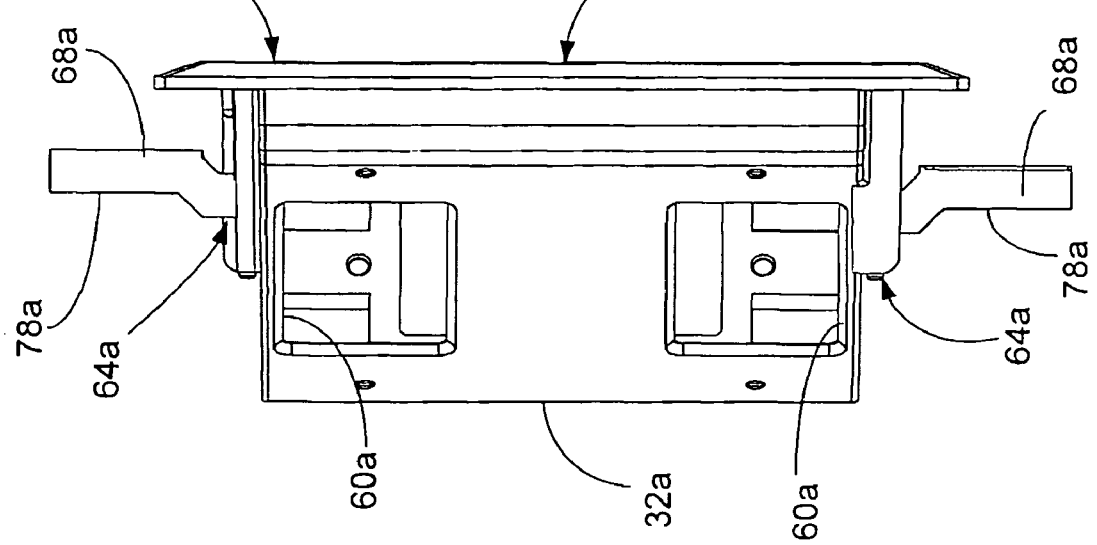
FIG. 11 is a left side elevation view of the wall plate bracket of FIG. 8, the support housing, low voltage connectors, and fasteners being removed.

The corresponding and relative sizes of the peripheries of the recess 88, front surface 81a, and mounting tabs 92, as shown in FIG. 8, allow the front surface 81a and mounting tabs to be inserted in the recess 88. The support housing 47a is assembled to the high voltage plate 24a by inserting the front surface 81a and mounting tabs 92 into the recess 88 such that the mounting tabs are located within corresponding shoulder sections 90. The location of the mounting tabs 92 within the corresponding shoulder sections 90 provides for the holes 94 to each be aligned with the corresponding hole 40a. The alignment of the corresponding pairs of the holes 40a, 94 allows for the insertion of one of the elongate fasteners 82a through each of the pairs of aligned holes 40a, 94. Tightening the elongate fasteners 82a draws the support housing 47a into engagement with the rear surface 36a of the high voltage plate 24a to secure the support housing thereto.

While the invention has been described by reference to certain preferred embodiments, it should be understood that numerous changes could be made within the spirit and scope of the inventive concept described. Accordingly, it is intended that the invention not be limited to the disclosed embodiments, but that it have the full scope permitted by the language of the following claims.

What is claimed is:

1. A wall plate bracket comprising:
a wall plate having front and rear surfaces, said wall plate having an interior opening;
a high voltage outlet;
a support housing having an inner surface and an interior region bounded by said inner surface, said support housing being configured for location of the high voltage outlet within said interior region, said support housing being connected to said rear surface such that said interior opening provides access to said high voltage outlet, and wherein said support housing has a mounting tab which is secured to said wall plate to provide said connection of said support housing to said rear surface, said wall plate having a recess in said rear surface such that said mounting tab is located in said recess; and
a clamp connected to said wall plate for securing said wall plate to a wall structure.

2. A wall plate bracket according to claim 1, wherein said interior opening has a periphery, the high voltage outlet having a periphery which corresponds to said periphery of said interior opening such that the high voltage outlet is accommodated within said interior opening.

3. A wall plate bracket according to claim 1, wherein said wall plate has a rib connected to said rear surface such that said rib is located between said support housing and rear surface.

4. A wall plate bracket according to claim 3, wherein said interior opening comprises a pair of opposing side edges,
said rib defining a first rib which is parallel to said opposing side edges,
said wall plate having a second rib connected to said rear surface, said second rib being parallel to said opposing side edges,
said first and second ribs being located on said rear surface such that said interior opening is between said first and second ribs,
said second rib being located relative to said interior opening such that said second rib is located between said support housing and rear surface.

5. A wall plate bracket according to claim 1, wherein said wall plate comprises a faceplate having an interior opening,
said wall plate further comprising a high voltage plate connected to said faceplate such that said high voltage plate extends rearwardly relative to said faceplate and access to said high voltage plate is provided through said interior opening of said faceplate,
said high voltage plate having front and rear surfaces which define said front and rear surfaces of said wall plate, said high voltage plate having an interior opening which defines said interior opening of said wall plate,
said wall plate further comprising a low voltage plate on which a low voltage connector is supported, said low voltage plate being connected to said faceplate such that said low voltage plate extends rearwardly relative thereto and access to said low voltage plate is provided through said interior opening of said faceplate.

6. A wall plate bracket according to claim 5, wherein said low voltage plate has an interior opening in which the low voltage connector is located, said interior opening of said low voltage plate having a periphery, the low voltage connector having a periphery which corresponds to said periphery of said interior opening of said low voltage plate such that the low voltage connector is accommodated within said interior opening of said low voltage plate.

7. A wall plate bracket according to claim 5, wherein said wall plate comprises a pair of flange structures each of which is connected to said faceplate, said flange structures being further connected to said high and low voltage plates such that said high and low voltage plates are between said flange structures.

8. A wall plate bracket according to claim 1, wherein said support housing has an outer periphery, said clamp having an arm which may be swung between a retracted position in which said arm is within said outer periphery and a secured position in which said arm extends beyond said outer periphery such that said arm does not obstruct insertion and refraction of said support housing through an opening in the wall structure when said arm is in said retracted position, said arm obstructing retraction of said support housing through the opening in the wall structure when said arm is in said secured position and the wall structure is secured between said arm and wall plate.

9. A wall plate bracket according to claim 1, wherein said mounting tab has a thickness, said recess having a depth which corresponds to said thickness.

10. A wall plate bracket comprising:
a faceplate having an interior opening;
a planar high voltage plate on which a high voltage outlet is supportable, said high voltage plate being connected to said faceplate such that said high voltage plate extends rearwardly relative thereto and access to said high voltage plate is provided through said interior opening of said faceplate;
a planar low voltage plate on which a low voltage connector is supportable, said low voltage outlet plate being connected to said faceplate such that said low voltage plate extends rearwardly relative thereto and access to said low voltage plate is provided through said interior opening of said faceplate, said low voltage plate including an edge which intersects and adjoins an edge of said high voltage plate, and wherein the low voltage plate is angularly offset from the high voltage plate; and
a support housing connected to said high voltage plate, said support housing having a mounting tab securable to said high voltage plate to connect said support housing to said high voltage plate, and said high voltage plate having a recess therein such that said mounting tab is located in said recess.

11. A wall plate bracket according to claim 10, wherein said intersection between said high and low voltage plates provides for said low voltage plate to be perpendicular relative to said high voltage plate.

12. A wall plate bracket according to claim 10, wherein said mounting tab has a thickness and said recess has a depth which corresponds to said mounting tab thickness.

13. A wall plate bracket according to claim 10, further including a first electrical connector insert adapted to receive at least one electrical receptacle, and said low voltage plate includes a first opening therein, and wherein the first insert is securable to said low voltage plate over said first opening.

14. A wall plate bracket according to claim 13, further including a second electrical connector insert adapted to receive at least one electrical receptacle, and said low voltage plate includes a second opening therein, and wherein the second insert is securable to said low voltage plate over said second opening.

* * * * *